Patented Apr. 4, 1950

2,502,518

UNITED STATES PATENT OFFICE 2,502,518

SYNTHETIC DRYING COMPOSITIONS

Sylvan Owen Greenlee and John David Zech, Louisville, Ky., assignors to Devoe & Raynolds Company, Inc., Louisville, Ky., a corporation of New York No Drawing. Application May 21, 1946, Serial No. 671,390

7 Claims. (Cl. 260—402)

This invention relates to new synthetic compositions and more particularly to compositions which are polymeric esters derived from the reaction of polyhydric phenols and polybasic acids which are polymeric oil acids.

The new compositions are polymeric esters of the polyhydric phenols with the polymeric drying oil acids, or composite or modified compositions containing such esters.

The invention includes the new compositions and articles and products made therefrom.

The new compositions are useful for the production of films, articles and other final reaction products of outstanding properties.

The invention is based on the discovery that improved compositions can be produced by esterifying polyhydric phenols and particularly dihydric phenols with polymeric oil acids and particularly with dimeric acids derived by the polymerization of unsaturated fatty acids such as those derived from soy bean oil and linseed oil.

We have found that valuable drying compositions can be prepared by the esterification of polyhydric phenols and dihydric phenols with such dimeric drying oil acids and that drying compositions can be thereby produced which are useful in making varnishes, compositions for vulcanization, etc.

The new compositions are prepared by esterifying the dihydric phenols with the dimeric oil acids. We have found that these polyesters can be prepared by an acid interchange reaction between the dimeric oil acids and the dihydric phenol diacetates without going to excessively high temperatures which would lead to discoloration and in some cases to excessive polymerization or bodying. Our method is economical and gives excellent yields whereas the usual methods for preparing phenol esters such as reactions of acid halides and acid anhydrides with phenols in the presence of basic reagents, besides being less economical, have other disadvantages such as yielding impure products and products having a darker color.

Briefly, our process involves heating the dimeric oil acids with low boiling monobasic acid diesters of dihydric phenols, that is diacetates or dipropionates (we prefer diacetates for economic reasons), at temperatures of about 180 to 275° C., and preferably at 200 to 250° C. while blowing the reaction mixture with an inert gas such as nitrogen or carbon dioxide to facilitate the removal of the liberated acetic acid which is collected in a suitable trap by known methods. The inert gas also serves to protect the ester from discoloration which usually accompanies exposure of this type of material to air or oxygen at high temperatures.

The diacetates of dihydric phenols can be prepared in excellent yields by known methods using acetic anhydride, acetyl chloride or ketene. We prefer to use acetic anhydride for economic reasons. The diacetates of many dihydric phenols are crystalline compounds. Thus the acetylation step serves as a convenient method for purifying the dihydric phenol by crystallization of the diacetate in addition to putting it into a form for esterification by acid interchange.

In cases where the starting dihydric phenol is sufficiently pure to give light colored products or where the color of the polyester is of no object, the diacetate need not be isolated from the acetylation solution containing liberated acetic acid and any excess acetic anhydride which was used in its preparation. The dimeric oil acid can be added directly to the acetylation mixture and the mixture treated in the same manner as previously described. The excess acetic anhydride is driven out by the inert gas and is trapped with the liberated acetic acid.

Another method of practicing our process of esterification is to heat a mixture of the dihydric phenol, dimeric oil acid and acetic anhydride (the acetic anhydride may be in equivalent amount or in excess), removing the liberated acetic acid through a suitable fractionating column at such a rate which will prevent the escape of acetic anhydride. In this case the acetylation of the dihydric phenol and the acid interchange reaction with the dimeric oil acid take place simultaneously. As the reaction nears completion, the temperature of the reaction mixture rises and at a temperature of about 200 to 225° C. an inert gas is bubbled through the mixture to remove all of the liberated acetic acid and any excess acetic anhydride which may have been used.

Regardless of which of these methods is used, polyester formation takes place at temperatures from about 180 to 275° C., preferably at 200 to 250°. Below 180° C. polyester formation becomes very slow and above 275° C. thermal decomposition and discoloration of the reactants and products may occur. Where very stable reactants are used and where polymerization due to unsaturation of either or both of the reactants do not interfere, temperatures of 250 to 275° C. may be used giving very rapid polyester formation. However, polyester formation is usually quite rapid at 225 to 250° C. and in some cases takes place very rapidly even at temperatures as low as 190 to 200° C.

Where highly unsaturated dibasic acids such as dimerized soy bean acids or dimerized linseed acids are used for polyester formation, it is usually best to avoid temperatures in excess of 250° C. and preferably to work at temperatures as low as possible without unduly prolonging the time of esterification. A rapid stream of inert gas serves to decrease the time of esterification a great deal. Likewise with substances which are very sensitive to discoloration, it is best to work at the lowest possible temperatures, usually at about 200° C. or at times as low as about 180° C.

Various polyhydric phenols can be used in making the new compositions. In general, the polyhydric phenols used may be any of the usual types of polyhydric phenols having two phenolic hydroxyls attached to separate aromatic nuclei so long as they do not contain any chemical groups which will interfere with the reaction of the carboxylic acids with the phenolic hydroxyl groups in preparing the new products. The polyhydric phenol may thus contain two or more phenolic hydroxyl groups in different benzene nuclei as is the case in fused ring systems such as naphthalene or in molecules in which the different benzene nuclei are attached by chains composed of carbon atoms and/or other atoms.

Illustrative of the polyhydric phenols which may be used in producing the new compositions of the present invention are bisphenol (p,p'-dihydroxydiphenyldimethylmethane) p,p'-dihydroxydiphenyl sulfone, dihydroxybenzophenones, dihydroxynaphthalenes, dihydroxydiphenyls, trihydroxynaphthalene, tetrahydroxynaphthalene, etc.

Still another type of polyhydric phenol which may be used in making the new compositions of the present invention is that derived by the reaction of a polyhydric phenol with polyhalides, using proportions of the reactions such that the final product contains unreacted phenolic hydroxyl groups. For example, a dihydric phenol may be obtained by the reaction of, say, three mols of bisphenol with two mols of dichlorodiethylether in the presence of alkali to give a long chain dihydric phenol. It will be understood that such complex dihydric phenols are mixtures and that in considering them as dihydric phenols they should be considered as having an average molecular weight corresponding to the ratio of reactants used in their preparation.

Compositions of somewhat different properties can be made from different polyhydric phenols. Particularly valuable compositions can be made by the use of high molecular weight dihydric phenols such as p,p'-dihydroxydiphenyl sulfone.

The polybasic acids used in making the new compositions are derived from the polymerization of unsaturated oils or the acids derived therefrom. The general procedure used in the preparation of the so-called dimeric acids consists in heating the unsaturated oil or one of its derivatives such as the free acids or methyl esters to high temperatures with or without the aid of a catalyst, in which case polymerization takes place through the double bonds to give polycarboxylic acids which are for the most part dibasic acids derived from the union of two unsaturated carbon chains through their double bonds. Dimeric acids may thus be readily prepared by the polymerization of linseed oil acids or soy bean oil acids and the dimeric acids so produced are for the most part derived from the union of two eighteen-carbon atom chains through their double bonds.

Such polymeric products are commonly referred to as dimeric acids but may contain small and varying percentages of higher polymeric acids such as tri- or tetrameric acids.

Such polymeric products may be freed from unpolymerized acids by solvent extraction or vacuum distillation. In some cases unpolymerized drying oil acids are advantageously present admixed with the polymeric acids, giving somewhat modified products when reacted with the polyhydric phenols to form new synthetic drying esters.

The proportions of dihydric phenol and dimeric acid used in making the new compositions can be somewhat varied. Since the dihydric phenols and dimeric acids are both difunctional they react to form polymeric products with the dihydric phenol residue and the dimeric acid residue alternating and being connected through ester linkages. Proportions approximating equivalent proportions are advantageously used or proportions containing a small excess of the dihydric phenol.

It is sometimes desirable to use small and varying amounts of monobasic acids and particularly of drying oil acids along with the dimeric acids in forming the new drying compositions.

The new compositions made from dihydric phenols and dimeric oil acids are particularly advantageous drying compositions, since they give products which are in general soluble in hydrocarbon solvents, particularly the aromatic type, and such solutions may be used as varnishes to give valuable protective coatings. Such compositions are capable of converting on exposure to air or with heat treatment and they are also capable of being vulcanized with the usual type of vulcanizing agents used in rubber manufacture.

Instead of using a single dihydric phenol and a particular dimeric acid, mixtures of polyhydric phenols can be used or mixtures of dimeric acids or of both, and products of somewhat different and varying properties can be obtained depending upon the polyhydric phenol or phenols and the dimeric acids used.

The character of the products can also be varied by varying the proportions of the dihydric phenols and dibasic acids. When equivalent proportions of a dihydric phenol and a dibasic acid are used and completely esterified the theoretical formula would be a linear polymer of infinite chain length but for practical purposes the reaction is carried only to the point where a polymeric product is formed which is soluble and useful in making varnish and other compositions.

When preparing drying compositions it is usually desirable to use a molar ratio near to 1:1 with the dihydric phenol diacetate in slight excess. The chain length and hence the viscosity can be regulated by changing the molar ratio of dibasic acid to dihydric phenol.

When the dimeric acid is in excess, the polyester is itself a dibasic acid and when the dihydric phenol is in excess the polyester is a dihydric phenol or its diacetate, depending upon the quantity of acetic anhydride used in preparing the dihydric phenol diacetate. Thus, for example if 4 mols of dihydric phenol and 3 mols of dimeric acid are to be esterified, the use of 8 or more mols of acetic anhydride would yield a polyester which would be a diacetate, while the use of 6 mols of acetic anhydride (exactly equivalent to the dimeric acid used) would yield a polyester which is a dihydric phenol, that is having free terminal phenolic hydroxyl groups.

Thus general Formula I theoretically represents the type of products which can be obtained when an axcess of dibasic acid is used:

I.

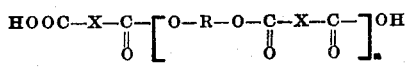

where X stands for a hydrocarbon chain and R stands for the aromatic nuclear structure of a dihydric phenol and $n$ is an integer.

When an excess of dihydric phenol diacetate is used the products are theoretically represented by general formula II:

II.

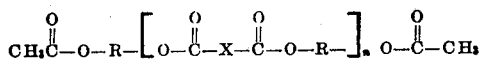

When the quantity of acetic anhydride used is exactly equivalent to the quantity of dibasic acid used (that is 2 mols acetic anhydride per mol of dibasic acid) with the dihydric phenol in excess of the dibasic acid, the products are theoretically represented by general Formula III:

III.

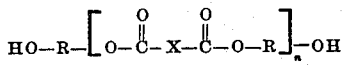

When monobasic acids are used to terminate the chains the products are theoretically represented by Formula IV.

IV.

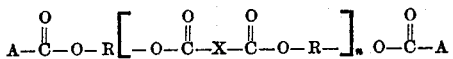

Where A is an organic radical such that the acid ACOOH has a boiling point above that of acetic acid, but preferably above 200° C.

When monohydric phenols are used to terminate the chains the products are theoretically represented by general formula V:

V.

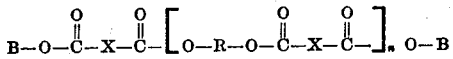

where B is a phenyl group, substituted phenyl, naphthyl or substituted naphthyl group.

Somewhat modified products can be obtained by using small and limited amounts of monofunctional reactants such as a monofunctional phenol or a monobasic acid, and the extent of the polymerization can be thereby limited and regulated. Thus, when a mixture of dimeric acids is used which is obtained by the polymerization of linseed oil acids or soy bean oil acids there may also be used some monocarboxylic acids such as those of unsaturated oils for reacting with the polyhydric phenol to give the new drying compositions.

The invention will be further illustrated by the following specific examples, but it will be understood that the invention is not limited thereto. The following typical procedure was used in the preparation of the dimeric acids referred to in the following examples:

The methyl esters of soy bean oil acids or linseed oil acids were heated with continuous agitation in the presence of .3% to .4% of anthraquinone at a temperature of 300° C. to 325° C. for a period of 15 to 20 hours. A slow stream of carbon dioxide was continually bubbled through the reaction mixtures during the heating period. The resulting product was freed from monomeric methyl esters by distillation at a pressure of 1 to 2 mm. until no more distillate could be obtained when the polymeric residue was heated in a vessle which was surrounded by an oil bath heated to a temperature of 250° C.

*Example I.*—A mixture of 156 parts of the diacetate of bisphenol and 265 parts of dimeric soy bean oil acids was placed in a vessel provided with a stirrer, a thermometer and a condenser connected for downward distillation. This reaction mixture was heated with stirring while passing a stream of carbon dioxide through the reaction mixture for four hours during which time the temperature was gradually raised from 200° C. to 249° C. The reaction product was a viscous mass which had an acid value of 2.9.

The product when dissolved in xylene to give a varnish of 50% solids had a viscosity of M bubble viscosimeter). This solution when treated with 0.05% cobalt drier gave a film which air dried in 26 hours.

*Example II.*—A mixture of 109 parts of diacetate of 4,4'-dihydroxy tetraphenylmethane and 135 parts of dimeric soy bean oil acids was reacted according to the procedure of Example I, heating for 5½ hours at 200 to 237° C. to give a product which had an acid value of 8.6 and when thinned to 50% solids with xylene gave a viscosity of Z. This solution when treated with 0.05% cobalt drier gave excellent air dried and baked films.

*Example III.*—Likewise, a mixture of 100 parts of a diacetate of p,p-dihydroxy diphenyl sulphone and 160 parts of dimeric linseed oil acids were heated for 43 minutes from 207 to 252° C. to give a viscous waxlike product of acid values 7.4 and a viscosity of T at 50% solids in xylene.

This solution of 50% solids when treated with .05% cobalt drier (based on solids) gives an excellent varnish for either air dry or baking treatment. Varnish films prepared from this product air dry within about five hours to give a hard, tough, flexible product.

*Example IV.*—A mixture of 125 parts of p,p'-dihydroxydiphenyl sulfone, 265 parts of dimeric soy bean oil acids and 104 parts of acetic anhydride was heated slowly over a period of about two hours to a temperature of 239° C., removing the liberated acetic acid through an efficient fractionating column. The mixture was continuously agitated during this heating period. The temperature was held at 239° C. for another 50 minutes while bubbling carbon dioxide through the mixture.

The product had an acid value of 2.5 and a viscosity of S in 50% solids in xylene. This solution when treated with 0.05% cobalt drier formed a film which air dried in 5 hours.

*Example V.*—A mixture of 100 parts of the diacetate of o-p'-dihydroxy diphenyl sulphone and 160 parts of dimeric soy bean oil acids when heated for 52 minutes from 229 to 244° C. gave a product having an acid value of 9 and a viscosity of B at 40% solids in xylene.

Varnish films prepared from this product containing cobalt drier gave tack free films in about 2 to 3 hours and extremely hard, flexible films when dried for 27 hours. Similar results were obtained when the films were baked for 30 minutes at 150° C.

*Example VI.*—A reaction mixture of 96 parts of diacetate of 2,2'-dihydroxy-1,1'-dinaphthyl methane (methylene, bis-beta naphthol) and 136 parts of dimeric soy bean oil acids was heated for 5½ hours at 200 to 226° C. to give a viscous product having an acid value of 11.3 and a viscosity of L at 40% solids in xylene.

This product treated with cobalt drier gave varnish films which air dried within one hour to give a tack-free product and the product was hard and flexible after two hours drying. Likewise, the product gives an extremely hard, flexible product when baked.

Example VII.—A mixture of 118 parts of a diacetate of 2,2'-dihydroxy-5,5'-dichlorodiphenyl methane and 177 parts of a dimeric acid obtained by the polymerization of linseed oil acid methyl esters was heated for 32 minutes at 211 to 228° C. to give a product having an acid value of 5.8 and a viscosity of Y at 50% solids in xylene.

This 50% solution when treated with driers and spread in thin films of .003" thickness air dried in about two hours to give a tack free film; and extremely hard, tough films were obtained on baking for 30 minutes at 100° C.

Example VIII.—A mixture of 120 parts of a diacetate of 2,2'-dihydroxy-1,1'-dinaphthyl and 170 parts of dimeric soy bean oil acids was heated for 4½ hours at 221 to 237° C. to give a product of acid value 2.5 and a viscosity of F at 50% solids in xylene.

Likewise, this composition gave hard, tough films when air dried for a few hours or when baked at elevated temperatures.

It is characteristic of protective coating films prepared from products of the type illustrated in the preceding examples that hard, flexible products can be obtained. The flexibility is probably to be accounted for in part by the fact that the products are essentially linear polymers of relatively long chain length and in part by the fact that the percentage of aliphatic structure present as long chains derived from the dimeric acids is relatively high, although the residues of the dihydric phenols in the polymer structure appears to aid in imparting desirable properties to the new compositions. A product containing about 70% of its structure as dimeric acid residues has about the same hardness as would be expected from normal oleoresinous varnishes and alkyds which contain as low as 40% oil modification. This unusual hardness is apparently due to the fact that high melting rigid structures are introduced into the polymeric chains by the use of such high melting dihydric phenol residues.

In the above examples the dihydric phenols and dimeric oil acids are used without admixture of other reactants. It is sometimes desirable to use mixtures of polyfunctional reactants. Phenolic acids having one phenolic hydroxyl and one carboxyl group are such reactants which may be used in admixture with the dihydric phenols and dimeric oil acids. Examples of such phenolic acids are salicyclic acid, p-hydroxybenzoic acid, anacardic acid (derived from cashew nut shells), 3-hydroxy-2-naphthoic acid, 4-hydroxyphenyl acetic acid, 4-hydroxyphenoxyacetic acid,

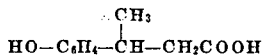

and phenolic acids such as obtained by the Friedel-Crafts condensation of 1 mole of phenol with 1 mole of unsaturated acids such as oleic, linoleic, linolenic, etc. or with one mole of a halogenated acid such as 2-chlorostearic acid, beta-chloropropionic acid, 12-bromostearic acid, etc. The following example illustrates the use of such mixtures, the acetate of salicyclic acid acting as a difunctional reactant, having a carboxylic acid group which can esterify the dihydric phenols and having a phenolic hydroxylic group which can in turn be esterified by the dimeric acids.

Example IX.—A mixture of 100 parts of the diacetate of p,p'-dihydroxydiphenyl sulfone, 155 parts of dimeric soy bean oil acids and 68 parts of the acetate of salicyclic acid was heated for 6 hours and 45 minutes at 200 to 229° C. to give a product of acid value of 4.8 and a viscosity of I at 50% solids in xylene.

This composition when treated with driers gave thin films which air dried in about two hours to give hard, tough products.

It is also sometimes desirable to introduce into the new composition resin acids to give composite rosin modified products. The production of such products is illustrated by the following examples:

Example X.—A mixture of 104 parts of the diacetate of bisphenol, 160 parts of dimeric soy bean acids and 31 parts of rosin were heated for 7 hours at 205 to 225° C. to give a product of acid value of 4.8 and a viscosity of I in 50% solids in xylene.

This product when treated with driers gave .003" films which air dried in about 2 hours to give tack free films.

Example XI.—A mixture of 111 parts of the diacetate of p,p'-dihydroxy diphenyl sulfone, 150 parts of dimeric soy bean oil acid and 38 parts of rosin was heated for six hours at 200 to 233° C. to give a product of acid value 10.4 and a viscosity of G at 50% solids in xylene.

This product when treated with drier gave thin films which air dried in about two hours to give hard infusible products.

It is also sometimes desirable to use monofunctional unsaturated oil acids to produce modification of the products obtained by the reaction of polyhydric phenols with dimeric unsaturated oil acids. The production of such drying compositions is illustrated by the following examples:

Example XII.—A mixture of 118 parts of the diacetate of 2,2'-dihydroxy-5,5'-dichlorodiphenyl methane, 160 parts of dimeric linseed oil acids and 20 parts of unpolymerized linseed oil acids was heated for one and one-half hours at 204 to 233° C. to give a product of acid value 2.9 and a viscosity of V at 30% solids in xylene.

This product when treated with driers and spread in thin films air dried in about two hours to give hard, infusible products.

Exampe XIII.—A mixture of 111 parts of the diacetate of p,p'-dihydroxydiphenyl sulfone, 150 parts of dimeric soy bean oil acids and 30 parts of China-wood oil acids was heated together for 2 hours and 45 minutes at 200 to 228° C. to give a product having an acid value of 10.2 and a viscosity of N at 50% solids in xylene.

This product when treated with driers and spread in thin films gave hard, tough products when air dried for two hours and the films were extremely hard after an overnight air dry. Similar hard, tough films were obtained by baking for one-half hour at 150° C.

Example XIV.—A mixture of 114 parts of the diacetate of p,p'-dihydroxydiphenyl sulfone, 120 parts of dimeric soy bean oil acids and 60 parts of China-wood oil acids was heated for seven hours at 200 to 216° C. to give a product having an acid value of 7.8 and a viscosity of D at 50% solids in xylene.

Similarly this product when treated with driers and spread in thin films gave hard, tough products when air dried overnight or when baked for one-half hour at 150° C.

The foregoing examples illustrate the use of different dihydric phenols and different dimeric acids. It will be understood that other dihydric phenols can be similarly used as well as other dimeric acids of drying oils and semi-drying oils; and that modified or composite products can be made from mixtures of the reactants either without or with the addition of other reactants, such as those above referred to.

It will thus be seen that the present invention provides new synthetic compositions which are polymeric esters of polyhydric phenols and particularly of dihydric phenols, with polymeric oil acids, and particularly dimeric oil acids, and which are valuable compositions for use in making films, varnishes, etc., as well as for use in making vulcanized compositions, etc.

We claim:

1. New synthetic drying compositions capable of forming drying films, said drying compositions being linear polymeric esters of dimeric unsaturated drying oil acids with dihydric phenols having the two phenolic hydroxyls attached to separate aromatic nuclei and said polymeric esters having alternating dimeric acid residues and dihydric phenol residues connected through ester linkages.

2. New synthetic drying compositions capable of forming drying films, said drying compositions being linear polymeric esters of dimeric soya oil acids with dihydric phenols having the two phenolic hydroxyls attached to separate aromatic nuclei and said polymeric esters having alternating dimeric acid residues and dihydric phenol residues connected through ester linkages.

3. New synthetic drying compositions capable of forming drying films, said drying compositions being linear polymeric esters of dimeric China-wood oil acids with dihydric phenols having the two phenolic hydroxyls attached to separate aromatic nuclei and said polymeric esters having alternating dimeric acid residues and dihydric phenol residues connected through ester linkages.

4. New synthetic drying compositions capable of forming drying films, said drying compositions being linear polymeric esters of dimeric linseed oil acids with dihydric phenols having the two phenolic hydroxyls attached to separate aromatic nuclei and said polymeric esters having alternating dimeric acid residues and dihydric phenol residues connected through ester linkages.

5. New synthetic drying compositions capable of forming drying films, said drying compositions being linear polymeric esters of dimeric unsaturated drying oil acids with 2,2'-dihydroxy dinaphthyl methane and said polymeric esters having alternating dimeric acid residues and dihydric phenol residues connected through ester linkages.

6. New synthetic drying compositions capable of forming drying films, said drying compositions being linear polymeric esters of dimeric unsaturated drying oil acids with p,p'-dihydroxy diphenyl sulfone and said polymeric esters having alternating dimeric acid residues and dihydric phenol residues connected through ester linkages.

7. New synthetic drying compositions capable of forming drying films, said drying compositions being linear polymeric esters of dimeric soya oil acids with p,p'-dihydroxy diphenyl sulfone and said polymeric esters having alternating dimeric acid residues and dihydric phenol residues connected through ester linkages.

SYLVAN OWEN GREENLEE.
JOHN DAVID ZECH.

REFERENCES CITED

The following references are of record in the file of this patent:

UNITED STATES PATENTS

| Number | Name | Date |
| --- | --- | --- |
| 2,082,790 | Cherry | June 8, 1937 |
| 2,239,533 | Mikeska | Apr. 22, 1941 |
| 2,298,914 | Auer | Oct. 13, 1942 |
| 2,341,239 | Percy et al. | Feb. 8, 1944 |
| 2,373,015 | Cowan et al. | Apr. 3, 1945 |